United States Patent
Liermann et al.

(10) Patent No.: US 7,614,942 B2
(45) Date of Patent: Nov. 10, 2009

(54) SMOKE STICK GRIPPER

(75) Inventors: Torsten Liermann, Laupheim (DE);
Markus Fuchs, Winnenheim (DE);
Steffen Mayer, Rutesheim (DE);
Benjamin Abele, Waldstetten (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 0 days.

(21) Appl. No.: 12/116,661

(22) Filed: May 7, 2008

(65) Prior Publication Data
US 2009/0011695 A1 Jan. 8, 2009

(30) Foreign Application Priority Data
May 25, 2007 (EP) ................... 07010524

(51) Int. Cl.
*A22C 15/00* (2006.01)
(52) U.S. Cl. .................................... 452/186
(58) Field of Classification Search .......... 452/185, 452/186, 30–32, 35–37, 46, 51
See application file for complete search history.

(56) References Cited

U.S. PATENT DOCUMENTS

| | | | | |
|---|---|---|---|---|
| 1,867,238 A | * | 7/1932 | Vogt | 452/186 |
| 2,264,077 A | * | 11/1941 | Gross | 452/186 |
| 2,780,831 A | * | 2/1957 | Harman | 452/47 |
| 3,831,769 A | * | 8/1974 | Frank | 211/113 |
| 4,547,931 A | | 10/1985 | Staudenrausch et al. | |
| 4,878,705 A | | 11/1989 | Arnquist | |
| 5,453,046 A | * | 9/1995 | Frame et al. | 452/186 |
| 5,945,798 A | | 8/1999 | Stagnitto et al. | |
| 7,255,638 B2 | * | 8/2007 | Stimpfl | 452/32 |
| 2004/0207222 A1 | | 10/2004 | Miyamoto | |
| 2005/0159093 A1 | | 7/2005 | Kasai | |

FOREIGN PATENT DOCUMENTS

| | | |
|---|---|---|
| DE | 39 30 876 C1 | 7/1990 |
| DE | 3930876 | 7/1990 |
| DE | 102 52 876 A1 | 6/2004 |

(Continued)

OTHER PUBLICATIONS

European Search Report based on European Patent Application No. 07 010 524.2; Filed May 25, 2007.

(Continued)

*Primary Examiner*—Thomas Price
(74) *Attorney, Agent, or Firm*—Marshall, Gerstein & Borun LLP

(57) ABSTRACT

A gripper system for gripping and transferring a smoke stick introduced into sausage loops or into other products suspended on hooks in loops or in pairs. For the simple and proper gripping and transferal of a smoke stick a smoke stick is first lifted to remove the products from the hooks with at least two grippers, wherein the grippers grip the smoke stick between the hooks, wherein the grippers hold and fix the smoke stick during removal. The smoke stick and the products suspended from it are then aligned by rotation of the smoke stick about its longitudinal axis. The smoke stick is then transported to a smoke stick depository, wherein the smoke stick is fixed in the grippers and then deposited on a smoke stick depository.

18 Claims, 6 Drawing Sheets

FOREIGN PATENT DOCUMENTS

DE 10252876 6/2004

OTHER PUBLICATIONS

European Search Report based on European Patent Application No. EP 07 01 05 24; Date of Mailing: Sep. 13, 2007.

European Search Report based on European Patent EP 07 01 0524; Date of Mailing: Sep. 13, 2007.

European Search Report for EP07010524.2 dated Sep. 20, 2007.

\* cited by examiner

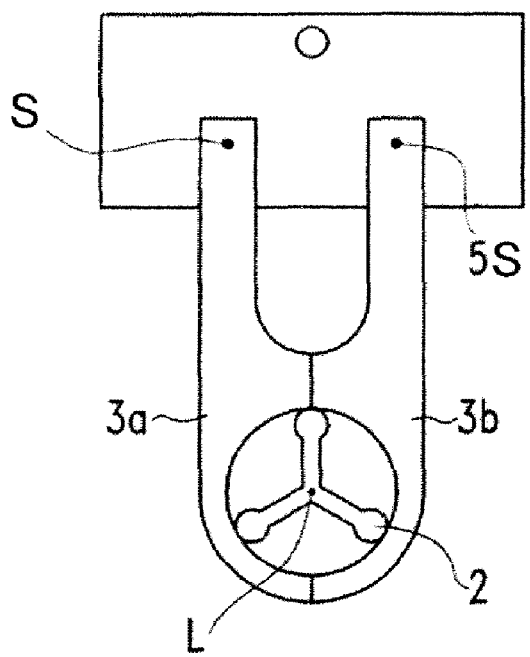
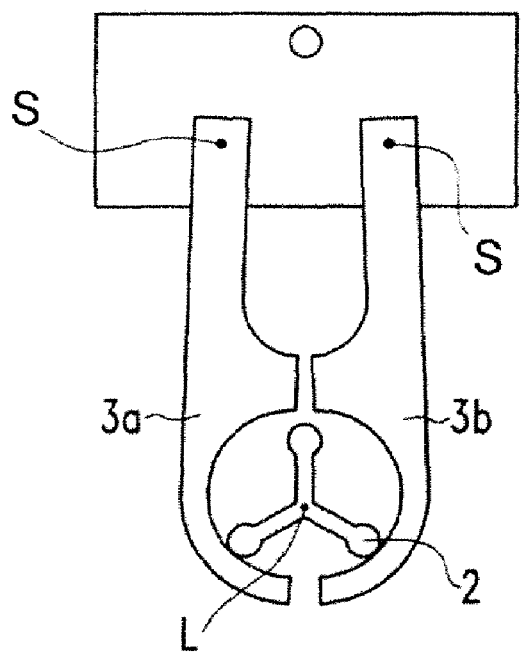
Fig.3a　　　　　　　　　　Fig.3b
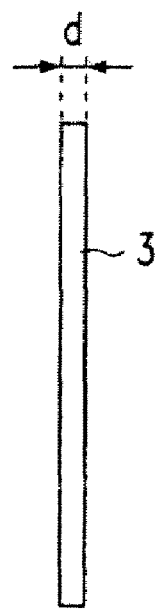
Fig.4

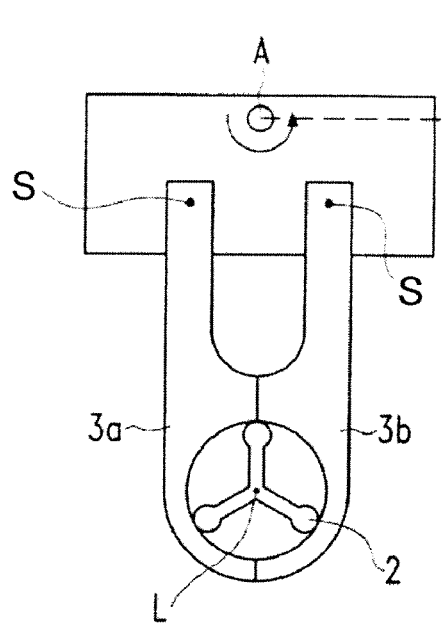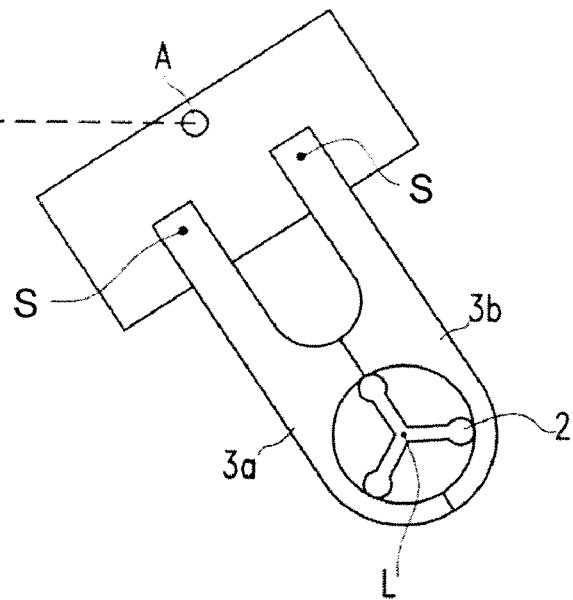
Fig.8a　　　　Fig.8b
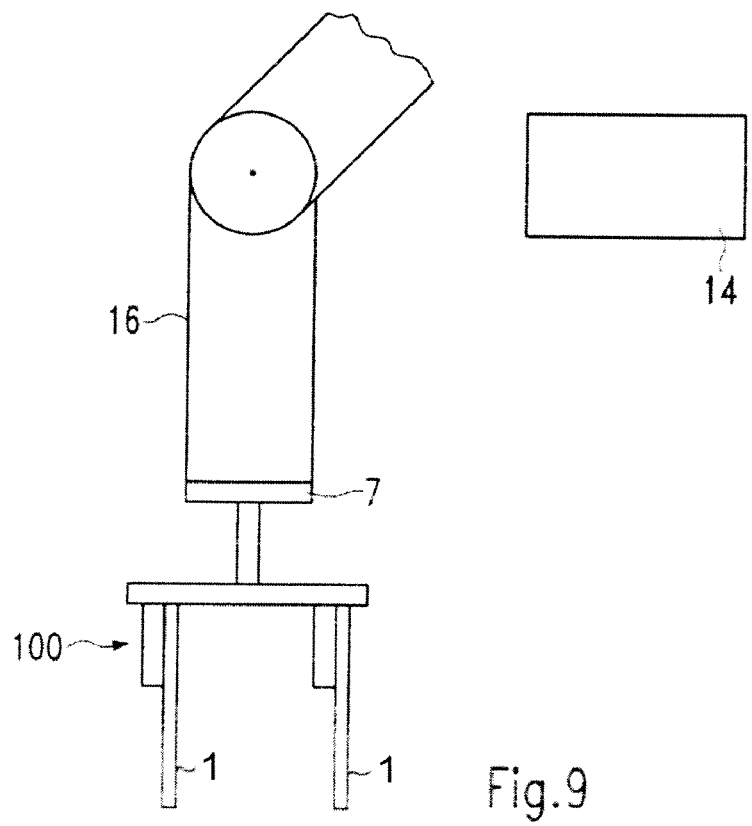
Fig.9

SMOKE STICK GRIPPER

CROSS-REFERENCE TO RELATED APPLICATION

The present application claims the benefit of priority of European Patent Application No. EP 07010524.2, filed May 25, 2007. The entire text of the priority application is incorporated herein by reference in its entirety.

FIELD OF THE DISCLOSURE

The disclosure relates to a method of gripping and transferring a smoke stick introduced into products, in particular sausages, hung in loops or in pairs on hooks as well as an appropriate gripper system.

BACKGROUND

During the industrial manufacture of sausages, the produced products are transferred directly from the filling machine onto a hanger. The pairs or loops of sausages are here preferably hung at the portioning point between two sausages on a hook. The sausages are then manually taken up with a smoke stick. This is then hung in a smoke trolley by the operator. The smoke trolley is then in turn pushed into a smoke chamber. The wide variety of different smoke sticks, smoke trolleys and sausage products significantly complicates the automation of the charging of smoke sticks and smoke trolleys. Therefore, so far no automated systems have been employed. Alternatively to this procedure, there are instead of smoke chambers also systems which smoke the products in a continuous run. Due to the more simple conditions for the automation of continuous systems here automated systems are employed for charging and unloading this equipment.

To transfer the sausages hanging on the hook of a hanger, the smoke stick is introduced between the suspended products. To do this, first a gripper module grips the smoke stick at one end. In the next operational step a handling system or robot moves the smoke stick into the hanger. In the next operational step the robot moves the second gripper module onto the smoke stick and grips it at the other end. Thus, the robot can remove the smoke stick complete with the products from the hanger. No high cycle rates can be achieved with this system. Furthermore, the sausages must here be very uniform and must be hung such that there is a free intervening space for introducing the smoke stick. With this solution a hook in the central region of a group of hooks must be removed so that the second gripper module can grip the smoke stick. A group of hooks is taken to mean the group of hooks from which the products are transferred to a smoke stick. Due to this the maximum loading on the smoke stick is reduced. This is significant in particular with smoke sticks for smoke trolleys, because they are only approx. 1,000 mm long. Furthermore, with this known solution gripping the smoke stick at one end complicates the reliable deposition of the smoke stick in a smoke trolley.

In particular the deposition is also found to be difficult, because many smoke trolleys have tolerance errors.

Moreover, in the state of the art there is the problem that with the removal of the products hung on the hooks, the products are not properly aligned downwards, but lie instead obliquely on the smoke stick. This means for example that the twist-off point between two products, that is between two sausages, does not hang at the upper end or at the upper tip of a star-shaped smoke stick. This is in particular because the smoke stick must be guided to the side of the hooks when lifting.

SUMMARY OF THE DISCLOSURE

Based on this, the object of the present disclosure is to provide a method and a gripper system which facilitate in a simple and reliable manner the automated gripping and transferal of a smoke stick.

According to the present disclosure, the smoke stick, which is positioned already under the hooks between the suspended products, is firmly gripped by at least two grippers, wherein the grippers hold and fix the smoke stick during the removal. Here, fixing is taken to mean that the gripper holds the smoke stick firmly such that it cannot move about its longitudinal axis or in the longitudinal direction. This facilitates a high handling speed without the smoke stick slipping in the gripper. Moreover, the method according to the disclosure facilitates the alignment of the smoke stick and the products hanging on it by rotation of the smoke stick about its longitudinal axis. As already explained, during the removal of the products suspended on the hooks, the products may not hang properly downwards, but instead lie somewhat obliquely on the smoke stick. By rotating the smoke stick about its longitudinal axis L, the smoke stick and the products can be aligned such that for example the twist-off point between two sausages comes to rest at the upper end of a smoke stick, advantageously on a tip of a smoke stick with a star-shaped contour. Due to the force of gravity acting on the sausage loops, the sausages align themselves automatically so that they hang downwards. The smoke stick can then be transported to a smoke stick depository, for example with a handling system or robot arm, wherein the smoke stick is here fixed in the grippers. The fixing facilitates a high handling speed without slippage of the smoke stick. Finally, the smoke stick is deposited on a smoke stick depository, in particular on a smoke stick depository of a smoke trolley.

According to the present disclosure, in step b) the fixing of the smoke stick is released so that the smoke stick can be rotated about its longitudinal axis and moved in its longitudinal direction in the grippers so that the smoke stick is aligned automatically by the force of gravity of the suspended products. Thus, in a simple manner the automatic downward alignment of the products or of the pairs or loops of sausages is facilitated without an additional drive. Thus, reliable removal of the sausage loops from the hanger is possible in which the smoke stick and the products suspended from it are automatically aligned by the force of gravity on the sausage loops. Thus, the sausage loops can be accurately suspended at the twist-off points which reduces possible pressure points.

Advantageously, the fixing is also released in step d). This facilitates compensation for geometrical errors in the smoke stick deposition when depositing the smoke sticks due to the fact that the smoke stick on being deposited in the smoke stick depository can move in its longitudinal direction up to the limit stop. This is particularly important because many smoke trolleys have tolerance errors which render the automation of charging and removal very complicated.

According to the present disclosure, before step a) the gripper grips the smoke stick which has already been introduced into the product pairs or loops in a region between the hooks. This enables the products to be removed without the suspended products being damaged.

In an advantageous way the suspension hooks of a group, which are intended for removal by the smoke stick, each have a certain constant spacing to one another, wherein at least one gripper grips the smoke stick in the central smoke stick region. Thus, according to the present disclosure complete smoke stick suspension is possible without individual hooks having to be removed from the group of hooks. The gripping of the smoke stick in the central region facilitates a simplified deposition in the smoke stick receptacle with the full use of the deposition region at the ends of the smoke stick. Thus, the very tight spatial conditions in a smoke trolley are taken into account.

According to a further embodiment of the present disclosure, in step b) the smoke stick is held in the gripper and the gripper is pivoted about an axis running parallel to the longitudinal axis of the smoke stick so that a relative rotation of the smoke stick is produced about its longitudinal axis. Thus, with this embodiment the free rotational movement, which was facilitated by not fixing in the previous embodiment, e.g. by an additional drive in the gripper, can be realized as a constrained movement in order to align the smoke stick and the suspended products. In doing this, the smoke stick can be preferably fixed, wherein however a relative rotation of the smoke stick about its longitudinal axis is produced. The constrained rotational movement about the axis running parallel to the longitudinal axis of the smoke stick can also be realized by a pivoting movement produced by the robot arm or handling system.

According to a preferred embodiment the steps a) and b) can then at least partially overlap in time. This means that already on lifting the smoke stick, the smoke stick is turned relatively in its longitudinal axis.

In step d) the smoke stick can then carry out a constrained movement in the longitudinal direction guided by the robot, wherein simultaneously a force measurement takes place to determine whether the smoke stick moves against the limit stop. Thus, tolerance errors of the smoke trolley can be compensated.

The gripper system according to the disclosure for realizing the present method has two selectable gripping modes: A first gripping mode in which the grippers hold and fix the smoke stick and a second gripping mode in which the grippers hold the smoke stick such that it can be rotated about its longitudinal axis and moved in the longitudinal direction. Here, the gripper can be controlled by a control device either in the first or second gripping mode. The gripper system according to the disclosure thus facilitates in a simple manner the automatic alignment of the smoke stick without an additional drive, because in the second gripping mode the smoke stick can be aligned by the weight of the products suspended on it such that the products hang downwards and are suspended from their twist-off point.

In an advantageous way the grippers are each formed as gripper tongs which have oppositely situated gripper arms which can move towards one another and which essentially enclose the smoke stick in a ring shape and fix it. Gripper arms which move towards one another are taken to mean that at least one of the gripper arms can move in the direction of the other gripper arm. The gripper tongs can also comprise scissor-like gripper arms which pass one another and which hold and fix the smoke stick. In this case the control of the opening/closing angle must be set depending on the format. The gripper geometry is here matched to the respective smoke stick cross-section.

If the gripper is formed as gripper tongs, the fixing can be released by a simple, slightly retracting movement of the gripper arms so that no additional drive for fixing and release of the fixing is required. It is however also possible that the gripper comprises a separate clamping device which fixes the smoke stick in the first gripping mode. A clamping device of this nature, e.g. a clamping plate, can be realized with or without a separate drive.

In an advantageous way the gripper arms are formed narrow, wherein the thickness of the gripper arms is smaller than the distance between the products suspended in loops or in pairs and is smaller than the spacing of the hooks on which the products are accommodated on the smoke stick. Thus, the gripper arms can simply engage between the sausages or between the hooks without damaging the sausages. Also, no hooks need to be removed so that the grippers can grip in the central region of the smoke stick. In an advantageous way the thickness of the gripper arms lies in a range from approx. 1 to about 30 mm.

It is advantageous if the smoke stick has a star-shaped outer contour. Thus, the twist-off point, for example, can lie between two sausages on a tip of the star-shaped contour.

If the gripper has an additional pivot axis, the smoke stick can rotate more substantially in the second gripping mode.

According to a second embodiment of the present disclosure the gripper system has at least two grippers, which have an additional pivot axis A, which essentially runs parallel to the longitudinal axis of the smoke stick, so that in the closed position in which they hold and fix the smoke stick, the grippers can be pivoted about the pivot axis. Thus, the free rotational movement, which is possible due to non-fixing, for example due to an additional drive in the gripper, can be realized as a constrained movement.

In an advantageous way the gripper system then has a robot or a handling system with a limit stop sensor or force sensor which detects the end stop of the smoke stick during movement in the longitudinal direction.

BRIEF DESCRIPTION OF THE DRAWINGS

The disclosure is explained in more detail with reference to the following drawings.

FIG. 3a illustrates schematically a front view of a gripper in a first gripping mode.

FIG. 3b illustrates the gripper shown in FIG. 3a in a second operating mode.

FIG. 4 illustrates a side view of the gripper shown in FIGS. 3a and 3b.

FIG. 8a illustrates schematically a front view of a gripper according to a second embodiment.

FIG. 8b illustrates the gripper shown in FIG. 8a in a pivoted position.

FIG. 9 shows schematically a gripper system according to the present disclosure.

DETAILED DESCRIPTION

Figure 5:
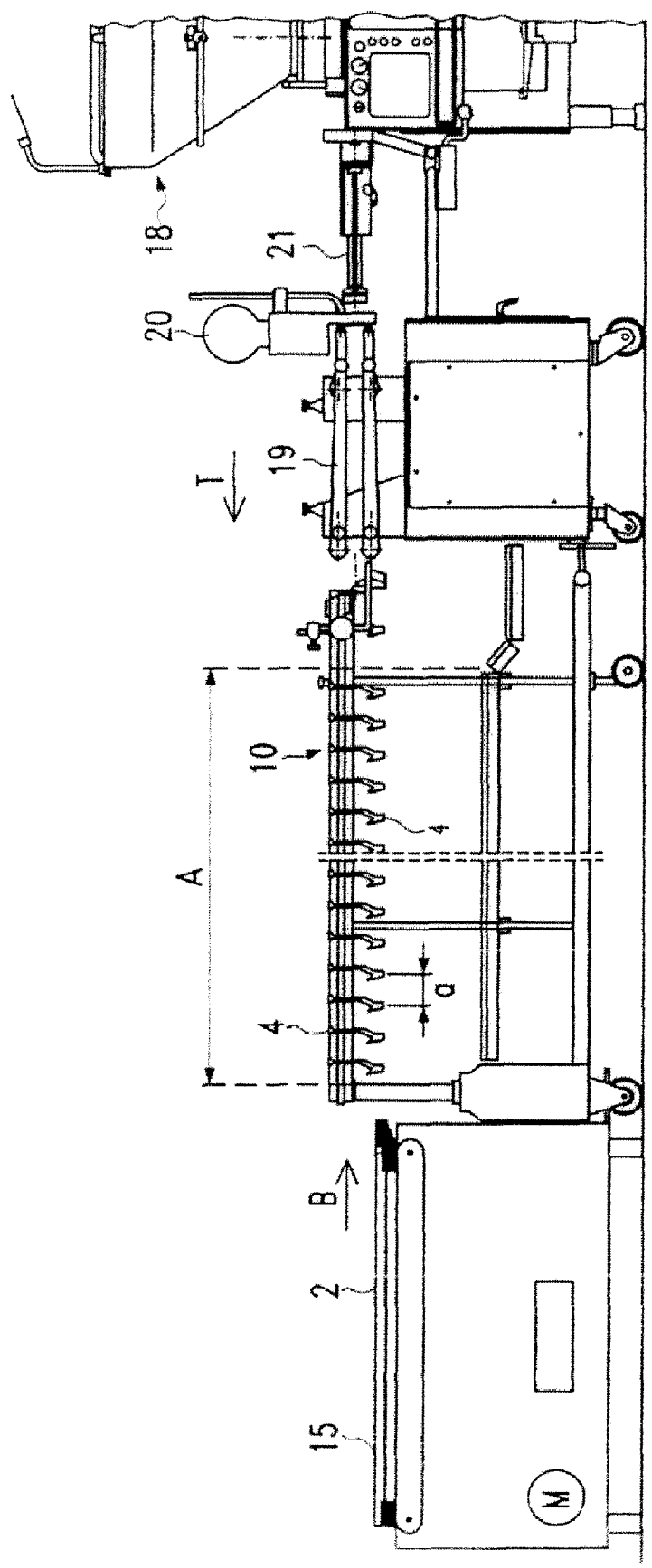
FIG. 5 illustrates schematically a side view of a filling machine with a hanger and a device for introducing a smoke stick.
Figure 6:
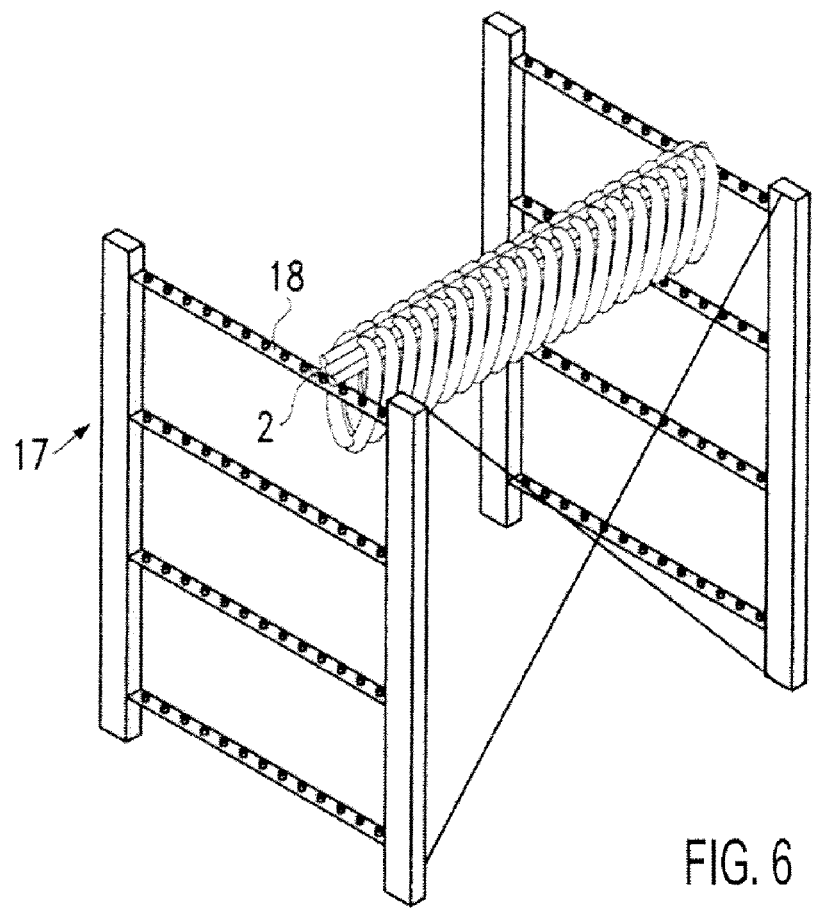
FIG. 6 illustrates a smoke trolley schematically.

FIG. 5 illustrates the conventional constituent parts of a filling device for filling sausage casings with paste mass. In a familiar manner a filling machine comprises a hopper 18 and a filling tube 21 through which the paste mass is filled into a sausage casing. Here, the sausages are portioned into single sausages by a twist-off unit or a clip module. The filled sausage skein is conveyed to a hanger 10 using a transport device 19, wherein the sausages are hung in open or closed loops or in pairs on the suspension hooks 4. The suspension hooks are passed in a guide and driven round using a drive element, for example a toothed belt or a chain, with the aid of a motor which is not illustrated. Thus, the sausages suspended from the hooks 4 are transported by the hanger 5 into a removal region A of the hanger 5. In the removal region A a smoke stick 2 is moved and positioned by a device 15 for positioning a smoke stick between the suspended products, as also emerges in particular from FIG. 7. The positioned smoke stick must then be gripped by a gripper system and conveyed to a smoke stick depository 18, in particular a smoke trolley 17, as is illustrated in FIG. 9. As emerges from FIG. 6, a smoke trolley has a large number of supporting surfaces 18 on which the smoke stick can be deposited. The smoke trolley 17 can accommodate a large number of smoke sticks 2 arranged adjacently and above one another.

Figure 1:
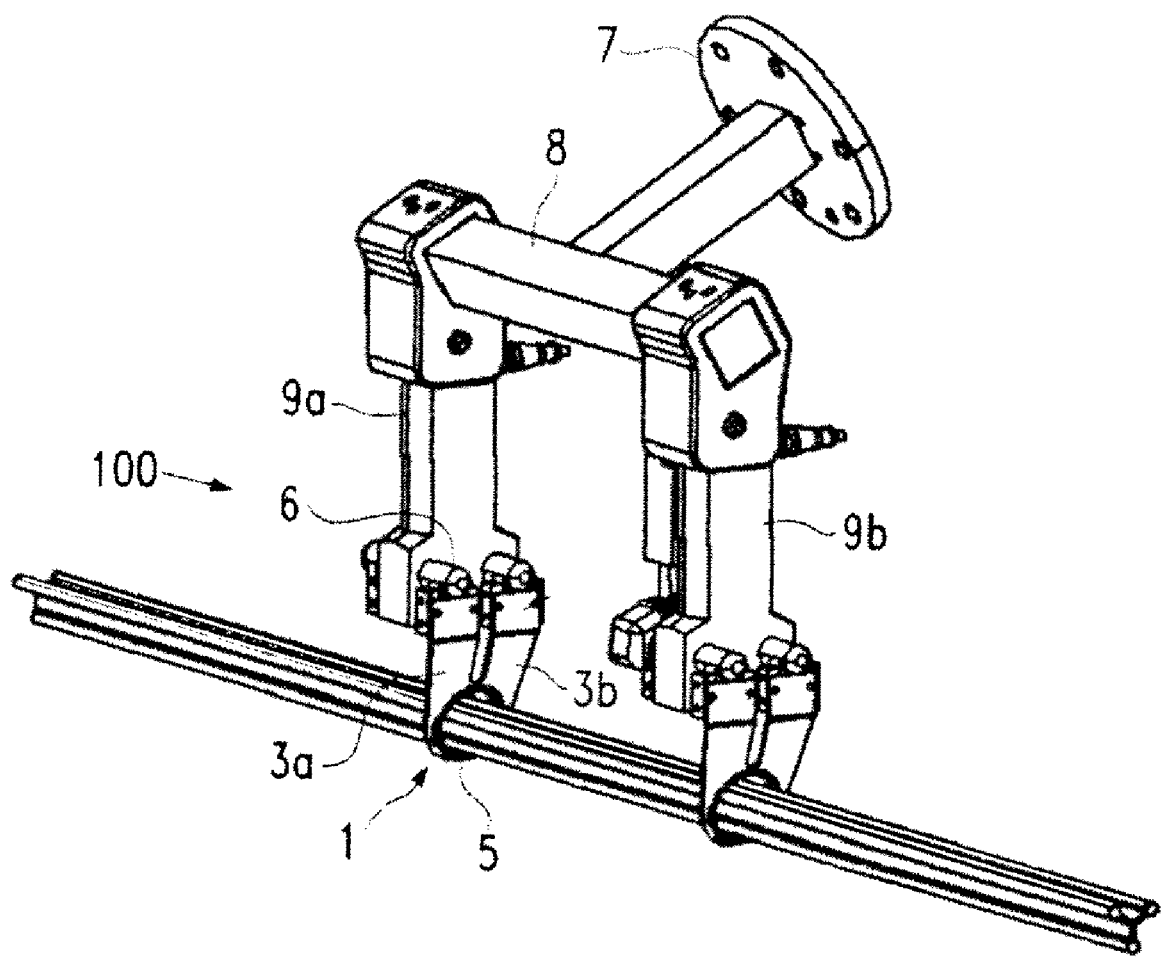
FIG. 1 illustrates in a perspective illustration a possible embodiment of a gripper system according to the present disclosure in a first operating mode.

FIG. 1 illustrates a gripper system 100 for gripping and transferring the smoke stick 2 introduced into products suspended on the hooks 4 in loops or in pairs. Here, the gripper system 100 comprises two grippers 1. The grippers are mounted on two holders 9a, b, which in turn are joined together by a transverse bar 8. Moreover, the gripper system 100 has a connecting element 7 through which the grippers can be joined to a handling system or to a robot arm 16 (refer to FIG. 9). In the embodiment illustrated in FIG. 1 the grippers 1 are each formed as gripper tongs which have oppositely situated gripper arms 3a, b which can move towards one another and which essentially enclose the smoke stick in a ring shape and fix it. As also emerges from FIG. 3a, the gripper arms can be pivoted about the pivot axis S and can, for example, be moved by a pneumatic drive 6 about the pivot axis S. It is however also sufficient if one of the gripper arms 3a, b is formed so that it can be moved or driven.

FIG. 1 illustrates a pneumatic drive for the grippers 1. However, a servo drive is also possible which facilitates an even more exact, process controlled drive.

FIGS. 1 and 3a illustrate a first operating mode of the gripper system according to the disclosure in which the gripper holds the smoke stick such that the smoke stick is fixed, i.e. that it neither rotates about its longitudinal axis 11 nor can be moved in the longitudinal direction. The smoke stick is clamped by the gripper 1. To do this, the two arms 3a, 3b can come together. The gripper arms 3a, b together form a ring-shaped, here an essentially circular recess 5, wherein the gripper geometry is matched to the cross-section of the smoke stick such that in the closed state of the gripper the smoke stick 2 is fixed.

FIG. 3b illustrates a second gripping mode in which the gripper holds the smoke stick 2 such that it can be rotated about its longitudinal axis L and moved in the longitudinal direction. To do this, the gripper arms 3a, b are, as shown in FIG. 3a by the arrows, moved slightly away from one another. In this second gripping mode the smoke stick can rotate about its longitudinal axis and can be moved in the longitudinal direction. Using a control device 14 (refer to FIG. 9) the gripper or grippers 1 can either be operated in the first operating mode illustrated in FIG. 3a or in the second operating mode illustrated in FIG. 3b.

Figure 2:
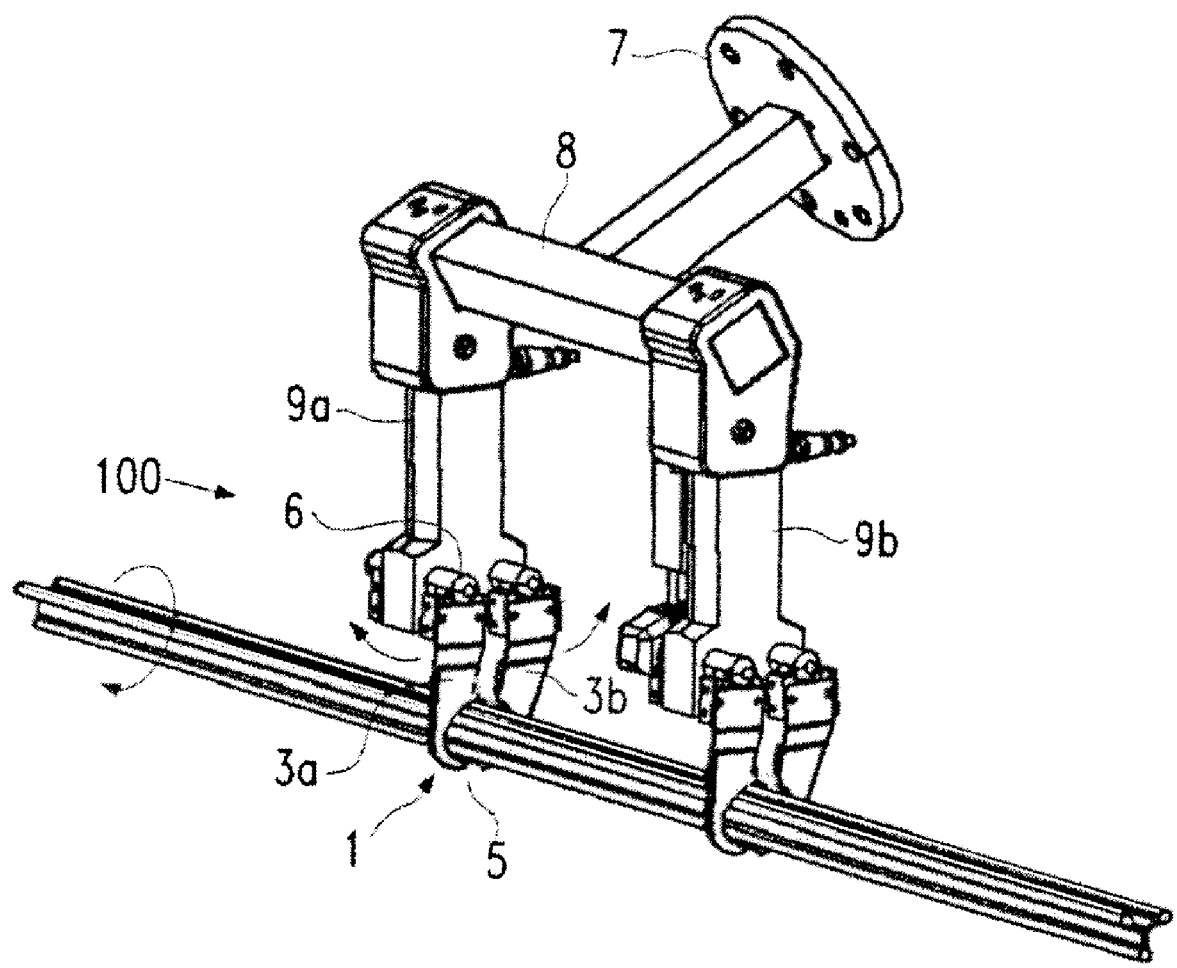
FIG. 2 illustrates the embodiment shown in FIG. 1 in a second operating mode.

FIG. 2 also illustrates the grippers 1 in the second operating mode. The second operating mode is in particular suitable, as is also explained more precisely in conjunction with the method according to the disclosure in the following, for aligning the smoke stick 2 and the products 11 suspended on it by rotating the smoke stick about its longitudinal axis L. If the fixing of the smoke stick is released, then the smoke stick is automatically aligned by the force of gravity on the suspended products so that the products hang down properly.

In an advantageous way in the embodiment illustrated in FIGS. 1 to 3 no separate drive is needed to fix the smoke stick 2. It is however also possible that the grippers comprise a separate clamping device which fixes the smoke stick in the first gripping mode.

This clamping device can be provided with or without a separate drive.

As emerges from FIG. 4, the gripper arms 1 are formed very narrow, wherein the thickness d of the gripper arms 1 is smaller than the distance between the products suspended in loops or in pairs and is smaller than the spacing a of the hooks 4 on which the products are accommodated on the smoke stick 2. As emerges from FIG. 5, the hooks 4 of a group of hooks, which suspend a number of products that are to be suspended on a smoke stick, have constant spacing a to one another. Due to the fact that the gripper arms are formed narrower than the spacing a between the individual hooks, the grippers can grip the smoke stick 2 from the side or from above in a region between the hooks (refer also to arrow G in FIG. 7). In an advantageous way the thickness of the gripper arms lies in a range from approx. 1 to about 30 mm.

The spacing between two grippers 1 lies in a range from approx. 100 mm to the maximum length of the smoke stick. The non-positive gripping principle could be replaced by a positive locking gripping principle or by a combination of locking by force/shape/friction.

FIGS. 8a and b illustrate a gripper system according to a second embodiment of the present disclosure, which essentially corresponds to the embodiment illustrated in connection with FIGS. 3a and 3b, wherein however the gripper 1 has an additional pivot axis A, which essentially runs parallel to the longitudinal axis of the smoke stick 2 so that the gripper can be pivoted (refer to FIG. 8b) about the pivot axis A in the closed position (refer to FIG. 8a) in which it holds and fixes the smoke stick 2. Due to the fact that the smoke stick 2 is pivoted with the gripper, a relative rotation of the smoke stick 2 about its longitudinal axis L is produced, as is clear in particular on comparison of the FIGS. 8a and 8b. This rotation can be used effectively for the alignment of the smoke stick and the products which are suspended on it as is explained in more detail in the following in connection with the method according to the disclosure. With this embodiment illustrated in FIG. 8 the gripper system, which is moved by the robot arm 16 in the longitudinal direction for the deposition of the smoke stick on a smoke stick depository 18, can comprise a limit stop sensor, which detects stopping of the smoke stick when moved in the longitudinal direction in order to be able to compensate tolerance errors in the smoke stick depository. When the limit stop sensor detects a limit stop, the robot arm 16 stops the movement in the longitudinal direction so that the smoke stick can be deposited.

It is also possible that the embodiment illustrated in FIGS. 1 to 3 comprises an additional pivot axis A so that the grippers are pivotable about an axis A parallel to the longitudinal axis L.

In the following a first embodiment of the method according to the disclosure is explained in more detail in conjunction with the FIGS. 1 to 3.

Figure 7:
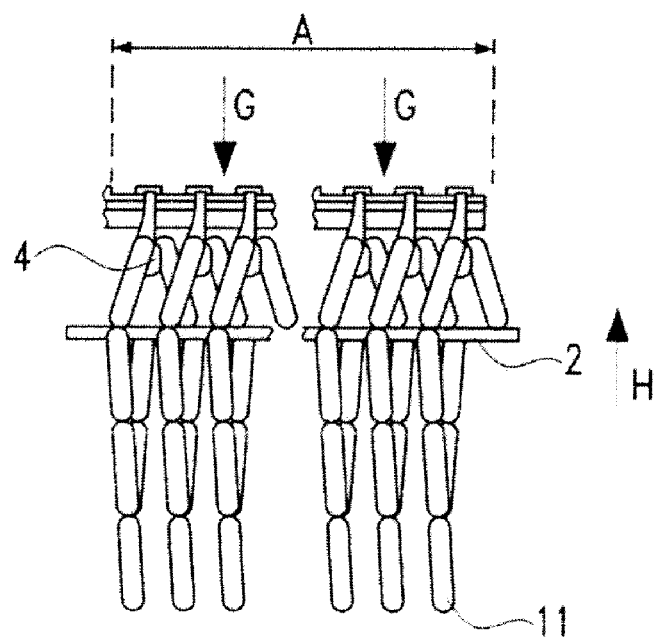
FIG. 7 illustrates schematically a smoke stick inserted into sausage loops.

Before the method according to the disclosure, as previously explained, the products are suspended in pairs or in loops on the hooks 4, as illustrated in FIG. 7, and the smoke stick 2 is introduced in the receiving region A of the hanger 10 between the suspended products with the aid of the device 15.

The robot arm 16 then moves the grippers of the gripper system 100 either from above (refer to arrows G in FIG. 7) or however from the side between the suspended products or between the hooks 4 above or next to the smoke stick and closes the grippers such that they hold and fix the smoke stick 2, as illustrated for example in FIGS. 1 and 3a. The introduction can take place with closed grippers in order not to damage the products.

Preferably, at least one gripper 1 here grips in the central smoke stick region. Since the grippers 1 are, as previously described, formed thinly, no hook 4 needs to be removed for this. The smoke stick can therefore be gripped in the central region without the accommodation capacity of the smoke stick being reduced. The gripping of the smoke stick 2 in the central region also facilitates a simplified deposition in the smoke stick depository 18 in the smoke trolley 17 with the full use of the deposition region at the end of the smoke stick 2. Thus, the very tight spatial conditions in a smoke trolley are taken into account.

The smoke stick is then lifted for removal of the products 11 from the hooks 4, as indicated by the arrow H in FIG. 7, wherein the grippers 1 hold and fix the smoke stick 2 during removal. Thus, it is ensured that the smoke stick does not slip in the gripper during the removal. The handling speed can thus be increased.

On lifting the smoke stick the products, i.e. the sausages, can come to rest obliquely on the smoke stick. This means that the sausages for example do not come to rest with the twist-off point at the upper end, i.e. on the tip of the star-shaped smoke stick, but rather the sausage is located obliquely on the smoke stick 2. This could however lead to pressure points. For this reason the fixing of the smoke stick is released so that the smoke stick can be rotated in the grippers 1 about its longitudinal axis L and moved in the longitudinal direction so that the smoke stick 2 is automatically rotated and aligned by the force of gravity on the suspended products 11 so that the products hang downwards properly. The release of the fixing can occur, for example as has been explained in conjunction with FIG. 3b, by the slight moving apart of the gripper arms 3a, 3b, wherein the gripper system has been appropriately controlled by a control device 14 to execute this second gripping mode. To transport the smoke stick 2 to a smoke stick depository 18 by means of a handling system or robot arm 16, the control device 14 controls the gripper system 100 such that it operates in the first gripping mode and fixes the smoke stick 2. Through the fixing of the smoke stick during the transfer to the smoke stick depository 18, a high handling speed can be realized without slippage of the smoke stick in the gripper.

The swinging of the products on the smoke stick during the transfer from the hanger to the smoke stick depository 18 can be reduced in that the smoke stick is orientated obliquely during braking for changes in direction, i.e. the front end of the smoke stick viewed in the direction of movement is raised.

When depositing the smoke stick on the smoke stick depository 18, for example in the smoke stick trolley, the controller 14 controls the gripper system 100 again such that the gripper operates in the second gripping mode in that the smoke stick fixing is switched off. The switched off smoke stick fixing facilitates the compensation of geometrical errors in the smoke stick depository when depositing smoke sticks, due to the fact that the smoke stick can be moved back in the longitudinal direction when it moves to the limit stop. That is particularly important because many smoke trolleys have tolerance errors which render the automation of charging and removal very complicated. During deposition the smoke stick can be deposited obliquely in the depository 18 so that the smoke stick slides into the deposition position at one end. The grippers can then be completely opened so that the smoke stick drops into the deposition position.

In a second embodiment of the present disclosure the grippers 1 illustrated in FIGS. 8a and 8b are used. The method corresponds essentially to the method previously explained, wherein however the free rotational movement about the longitudinal axis L of the smoke stick, which is facilitated in the first embodiment by the release of the fixing, can be executed as a constrained movement by an additional drive in the gripper. After or during the removal of the products from the hook 4, the gripper 1 is pivoted (FIG. 8b) about an axis A (pivot axis extends through the gripper) ruining parallel to the longitudinal axis L of the smoke stick 2 for alignment of the smoke stick and the products 11 suspended on it, so that a relative rotation of the smoke stick 2 is produced about its longitudinal axis L. Through this relative rotation I about the longitudinal axis L, the smoke stick and the products suspended on it can, as previously described, be aligned, wherein the products then hang properly downwards. Here, the steps of lifting the smoke stick for removal of the products and the pivoting of the grippers about the axis A can at least partially overlap in time. This pivoting movement can alternatively or additionally also be produced by a pivoting movement of the robot arm, wherein then the pivot axis runs through the robot arm.

In the second method according to the present disclosure a constrained movement in the longitudinal direction by a robot can be carried out for the deposition of the smoke stick, wherein simultaneously a force measurement occurs to determine whether the smoke stick comes against the limit stop in the smoke stick depository 18 during its movement in the longitudinal direction. On contacting the limit stop or on measuring a certain force, the movement of the smoke stick in the longitudinal direction can then be stopped.

According to a further embodiment it would also be conceivable with the first embodiment or with the method corresponding to the first embodiment to pivot the grippers additionally about the axis A when the gripper has released the fixing of the smoke stick in order to align the smoke stick.

The previous embodiments have been described in conjunction with grippers which have oppositely situated gripper arms which can move towards one another and which meet in the closed position. It is however also possible to form the gripper arms such that they pass one another in a scissor shape in order to hold and fix the smoke stick. In this case the control 14 of the opening/closing angle must be set depending on the format.

The present disclosure has been explained in detail in conjunction with a smoke stick. The expression smoke stick should not be of a restricting nature however and should also include other bar-shaped parts with products suspended on them which are then not smoked. The gripper system according to the disclosure is suitable, as previously described, in particular for the removal of smoke sticks from sausage hangers. It is also suitable for the removal of smoke sticks from smoke/drying trolleys, from magazines and washing systems or similar machines and for the deposition of smoke sticks in smoke/drying trolleys, in magazines, washing systems or similar machines.

What is claimed is:

1. Method of gripping and transferring a smoke stick introduced into products, hung in loops, or in pairs, on hooks, comprising:

a) Lifting the smoke stick for the removal of the products from the hooks with at least two grippers which grip the smoke stick, wherein the grippers hold and fix the smoke stick during removal, b) aligning the smoke stick and the products suspended from the smoke stick by rotation of the smoke stick about a longitudinal axis L thereof, c) transporting the smoke stick to a smoke stick depository, wherein the smoke stick is fixed in the grippers, and d) depositing the smoke stick on a smoke stick depository.

2. Method according to claim 1, and in step b), releasing the fixing of the smoke stick so that the smoke stick can be rotated about its longitudinal axis L and moved in its longitudinal direction in the grippers so that the smoke stick is aligned automatically by the force of gravity on the suspended products.

3. Method according to claim 1, and in step d) releasing the fixing of the smoke stick.

4. Method according to claim 1, and before step a), the grippers gripping the smoke stick as introduced into the product pairs or loops in a region between the hooks.

5. Method according to claim 1, and causing the hooks of a group of hooks to each have a certain constant spacing (a) to one another and at least one gripper grips the smoke stick in the central smoke stick region.

6. Method according to claim 1, and in step b), the grippers holding the smoke stick and the grippers pivoting about an axis A running parallel to the longitudinal axis L of the smoke stick so that a relative rotation of the smoke stick is produced about its longitudinal axis L.

7. Method according to claim 6, and in step b), the grippers fixing the smoke stick.

8. Method according to claim 7, and overlapping the steps a) and b) at least partially.

9. Method according to claim 7, in step d), the smoke stick carrying out a constrained movement in the longitudinal direction guided by a robot, wherein simultaneously a force measurement takes place to determine whether the smoke stick is moving against the limit stop.

10. Gripper system according to claim 9, wherein the smoke stick has a star-shaped contour.

11. Gripper system, in particular for gripping a smoke stick introduced into products, hung in loops or in pairs, comprising: at least two grippers, which grip the smoke stick, the gripper system having two selectable gripping modes, a first gripping mode, in which the grippers hold and fix the smoke stick, and a second gripping mode, in which the grippers hold the smoke stick, such that the smoke stick can be rotated about its longitudinal axis L and moved in the longitudinal direction, and a control device for controlling the grippers in either the first or second gripping mode.

12. Gripper system according to claim 11, wherein the grippers are each formed as one of gripper tongs, which have oppositely situated gripper arms that can move towards one another, and that close around and fix the smoke stick in an essentially ring-shaped manner, or which comprise scissor-like gripper arms running past one another, that hold and fix the smoke stick.

13. Gripper system according to claim 12, wherein the fixing can be released by the gripper arms moving away from one another.

14. Gripper system according to claim 12, wherein the gripper arms are formed narrow, wherein a thickness "d" of the gripper arms is smaller than a distance "a" between the products suspended in loops or in pairs and is smaller than the spacing of the hooks on which the products are accommodated on the smoke stick.

15. Gripper system according to claim 14, wherein the thickness of the gripper arms lies in a range from about 1 to about 30 mm.

16. Gripper system according to claim 11, wherein the grippers comprise a separate clamping device which fixes the smoke stick in the first gripping mode.

17. Gripper system according to claim 11, wherein the grippers have a pivot axis (A) which runs substantially parallel or parallel to the longitudinal axis L of the smoke stick.

18. Gripper system according to claim 11, wherein the products are sausages.

* * * * *